(12) United States Patent
Tzegazeab et al.

(10) Patent No.: US 10,571,329 B2
(45) Date of Patent: Feb. 25, 2020

(54) LEVEL SWITCHES

(71) Applicant: Rosemount Measurement Limited, Berkshire (GB)

(72) Inventors: Tadewos Tzegazeab, Berkshire (GB); Rehan Azfar Ashraf, Berkshire (GB); Gregory Michael Leach, Middlesex (GB)

(73) Assignee: ROSEMOUNT MEASUREMENT LIMITED, Berkshire (GB)

( * ) Notice: Subject to any disclaimer, the term of this patent is extended or adjusted under 35 U.S.C. 154(b) by 0 days.

(21) Appl. No.: 15/572,179

(22) PCT Filed: May 6, 2016

(86) PCT No.: PCT/GB2016/051308
§ 371 (c)(1),
(2) Date: Nov. 7, 2017

(87) PCT Pub. No.: WO2016/181115
PCT Pub. Date: Nov. 17, 2016

(65) Prior Publication Data
US 2018/0136030 A1      May 17, 2018

(30) Foreign Application Priority Data
May 8, 2015   (GB) .................................. 1507896.7

(51) Int. Cl.
*G01F 23/296*       (2006.01)
(52) U.S. Cl.
CPC ...... *G01F 23/2968* (2013.01); *G01F 23/2967* (2013.01)

(58) Field of Classification Search
CPC .... G01F 23/00; G01F 23/296; G01F 23/2966; G01F 23/2967; G01F 23/2968; G01N 29/022; G01N 29/036; G01N 29/22; H01R 13/658
See application file for complete search history.

(56) References Cited

U.S. PATENT DOCUMENTS

| 6,918,296 | B1 | 7/2005 | Urquidi et al. | |
| 8,370,089 | B2 | 2/2013 | Alstad et al. | |
| 8,746,071 | B2 * | 6/2014 | Dreyer | G01F 23/2967 73/627 |
| 2004/0078164 | A1 * | 4/2004 | Lopatin | G01F 23/2967 702/100 |
| 2005/0210954 | A1 * | 9/2005 | Raffalt | G01F 23/2967 73/1.82 |

(Continued)

FOREIGN PATENT DOCUMENTS

| EP | 2 667 164 | 11/2013 |
| WO | WO 97/26512 | 7/1997 |

(Continued)

OTHER PUBLICATIONS

International Search Report from PCT/GB2016/051308, dated Aug. 9, 2016.

(Continued)

*Primary Examiner* — Suman K Nath
(74) *Attorney, Agent, or Firm* — Westman, Champlin & Koehler, P.A.

(57) ABSTRACT

The invention describes a vibrating fork point level switch with multiple switching points.

8 Claims, 2 Drawing Sheets

(56) References Cited

U.S. PATENT DOCUMENTS

| | | | |
|---|---|---|---|
| 2014/0352425 A1* | 12/2014 | Wang | G01F 23/2966 |
| | | | 73/290 R |
| 2015/0052997 A1 | 2/2015 | Schlachter | |
| 2015/0177045 A1* | 6/2015 | Cobianu | G01F 23/2968 |
| | | | 367/99 |

FOREIGN PATENT DOCUMENTS

| | | |
|---|---|---|
| WO | WO 98/09139 | 3/1998 |
| WO | WO 01/51898 | 7/2001 |
| WO | WO 2006/084263 | 8/2006 |
| WO | WO 2009/078734 | 6/2009 |
| WO | WO 2014/179050 | 11/2014 |

OTHER PUBLICATIONS

Written Opinion (PCT/ISA/237) from PCT/GB2016/051308, dated Aug. 9, 2016.
Search Report from GB Application No. 1507896.7, dated Oct. 22, 2015.

* cited by examiner

| | | Switching Points (Frequencies) | | | | | |
|---|---|---|---|---|---|---|---|
| | | Too Dry | Dry | Wet | Too Wet | Zero | |
| Operating Bands | 1 | TD1 | D1 | W1 | TW1 | Zero1 | OB1 = OB3 - 2X% |
| | 2 | TD2 | D2 | W2 | TW2 | Zero2 | OB2 = OB3 - X% |
| | 3 | TD3 | D3 | W3 | TW3 | Zero3 | OB3 = Default |
| | 4 | TD4 | D4 | W4 | TW4 | Zero4 | OB4 = OB3 + X% |
| | 5 | TD5 | D5 | W5 | TW5 | Zero5 | OB5 = OB3 + 2X% |
| | 6 | TD6 | D6 | W6 | TW6 | Zero6 | OB6 = OB3 + 3X% |
| | . | | | | | | |
| | . | | | | | | |
| | Xn | TDXn | DXn | WXn | TWXn | ZeroXn | OB1 = OB3 + (Xn-3)X% |

LEVEL SWITCHES

CROSS-REFERENCE TO RELATED APPLICATION

This Application is a Section 371 National Stage Application of International Application No. PCT/GB2016/051308, filed May 6, 2016 and published as WO 2016/181115 on Nov. 17, 2016, in English, which claims priority to GB Application No. 1507896.7, filed May 8, 2015, the contents of which are hereby incorporated by reference in their entirety.

FIELD OF THE INVENTION

This invention relates to a level switch and, in particular though not necessarily solely, to a vibrating fork point level switch.

BACKGROUND OF THE INVENTION

Vibrating fork point level switches are in widespread use as a means for detecting when an interface between media in a process vessel is at a particular level within the vessel. The interface may, for example, be between a liquid and a gas, typically air, present above the liquid surface. When the interface between the liquid and the gas reaches the position of the switch, the operating frequency of the switch is affected. The change of frequency is sensed and a switching and/or alarm signal generated.

At present vibrating fork point level switches are configured to operate between a single 'wet' condition and a single 'dry' condition however in many applications in which vibrating point level switches are used, a variety of interfaces may be present. For example, in oil separators, oil is separated from water and sludge displaced during the extraction of the oil. There is thus one interface between the sludge and the water and another between the water and the oil. An operator may also wish to differentiate when a sensor is in contact with air as well as when the sensor is in contact with either oil, water or sludge.

It is an object of this invention to provide a level switch that will go at least some way to addressing the aforementioned wish; or which will at least provide a novel and useful choice.

SUMMARY OF THE INVENTION

Accordingly in a first aspect the invention provides a vibrating fork point level switch characterised in that it is configured to provide switching outputs in response to at least two changes of media in contact with said switch.

Preferably said level switch includes a drive facility operable to vibrate the fork at a first frequency when the fork is exposed to air, said fork assuming a second frequency of vibration when in contact with a first fluid in contact with said air; said switch further including a control facility operable to distinguish between said first and second frequencies and to effect a switching operation in the event of a change between said first and second frequencies being detected; said switch being characterised in that when said fork is exposed to a second fluid in contact with said first fluid, said fork assumes a third frequency of vibration, said control facility being further operable to distinguish between said second frequency and said third frequency and to effect a second switching operation in the event of a change between said second frequency and said third frequency.

Preferably said outputs are configured to operate a plurality of relays in the event of a change of medium.

Alternatively said outputs comprise different voltages to indicate a change of medium.

Alternatively said outputs comprise different currents to indicate a change of medium.

Preferably the frequencies determining at least one switching operation are manually selectable.

In a second aspect the invention provides a vibrating fork point level switch including a plurality of operating bands, each of said bands defining different switching points; and a user selectable control operable to select at least one of said bands Preferably said switch includes a manually operable control to effect selection of a particular band.

Preferably said switching points comprise switching frequencies.

Many variations in the way the invention may be performed will present themselves to those skilled in the art, upon reading the following description. The description should not be regarded as limiting but rather as an illustration, only, of one manner of performing the invention. Where appropriate any element or component should be taken as including any or all equivalents thereof whether or not specifically mentioned.

BRIEF DESCRIPTION OF THE DRAWINGS

The invention will now be described with reference to the accompanying drawings in which.

DETAILED DESCRIPTION OF WORKING EMBODIMENTS

Figure 1:
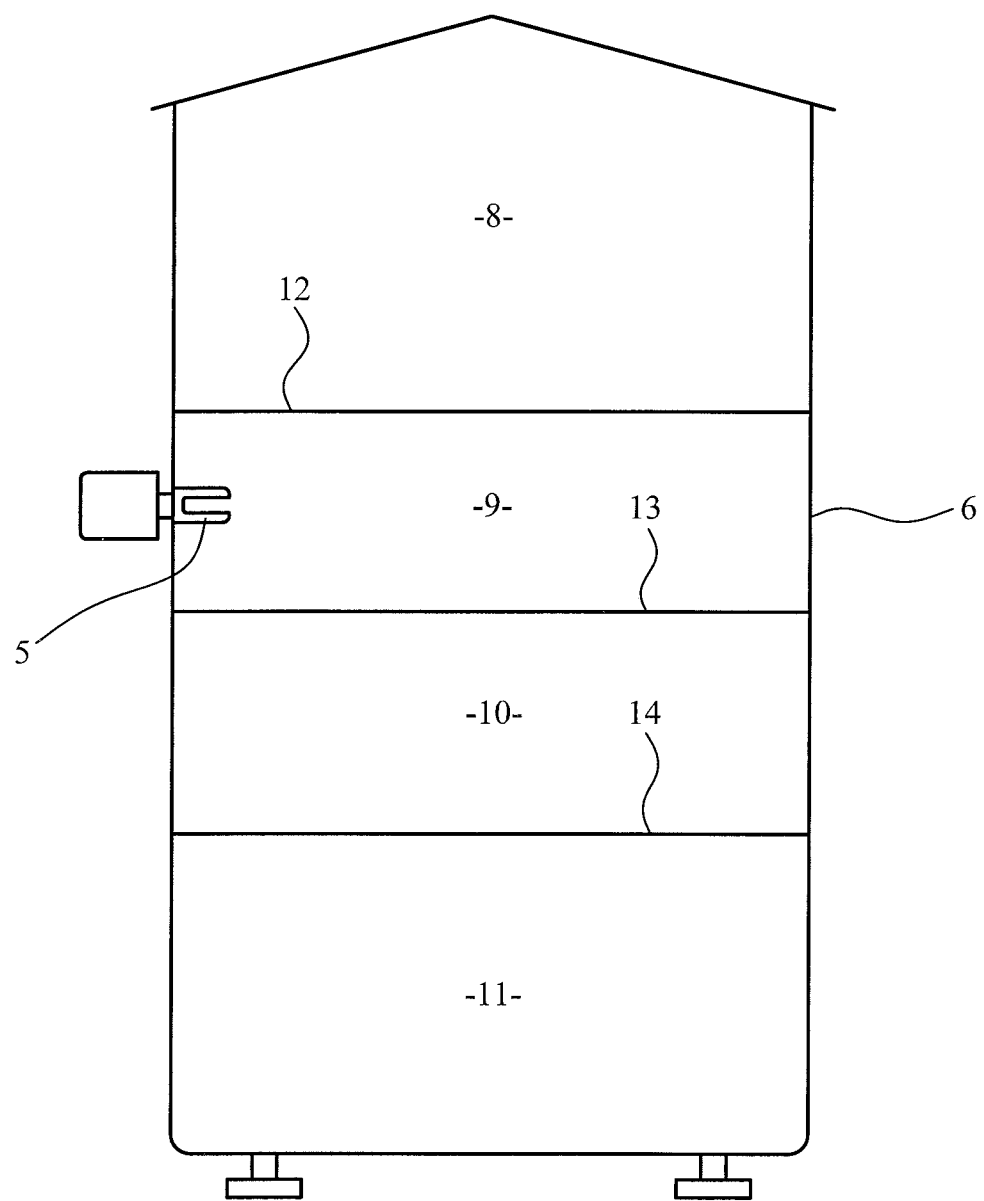
FIG. 1: shows a process vessel having a plurality of media interfaces therein, and a vibrating fork point level switch according to the invention.

Referring firstly to FIG. 1, the invention provides a vibrating fork point level switch 5 for use in detecting when the interfaces between a number of media in vessel 6 are at the level of the switch. By way of example only, the vessel may contain layers of air 8, oil 9, water 10 and sludge 11, the layers being separated by interfaces 12, 13 and 14 respectively. In process environments the levels of the interfaces may vary significantly and require different control choices to be made when particular interfaces reach particular levels. For example, if the interface 12 falls below the switch 5, a pump may be switched on to introduce more raw fluid into the vessel. As another extreme, if the interface 14 reaches the level of the switch 5, this may generate an alert that the vessel needs to be emptied and cleaned.

In the past vibrating fork level switches have been configured to distinguish a single change in media only—most commonly to indicate when the fork is either 'dry' or 'wet'. As will be apparent from the following description, the invention provides a vibrating fork point level switch that can distinguish between a greater number of media.

Figures 2, 3:
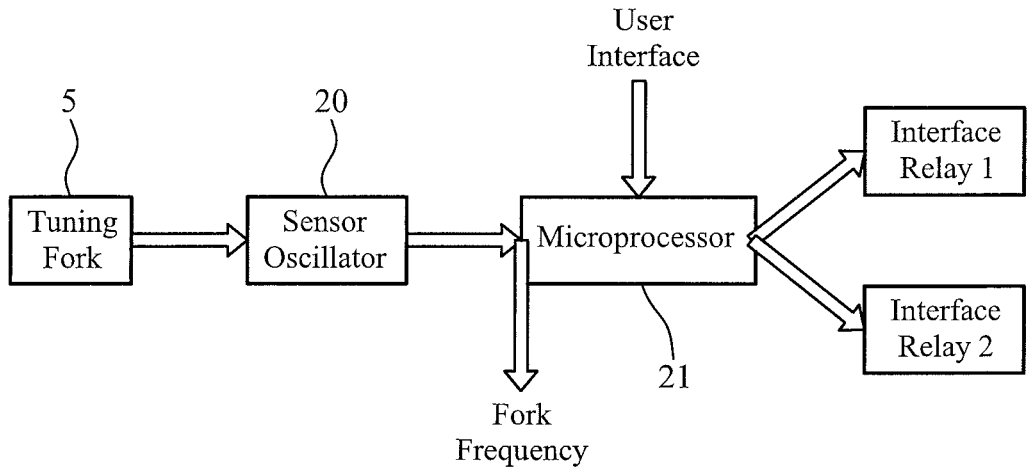
FIG. 2: shows a schematic operating diagram of a vibrating fork point level switch according to the invention.
FIG. 3: shows a possible implementation of user interface shown in FIG. 2.

Turning now to FIG. 2, the frequency of vibration of the fork 5 is sensed by an oscillator circuit 20 which outputs a signal to microprocessor 21. Conventionally when the microprocessor determines a change in frequency exceeding a pre-determined figure, a change of medium in contact with the fork 5 is assumed. In other words an interface between two different media is at the level of fork 5. When the interface is detected a switching signal is generated and, in the example shown, is sent to relay 1 to effect a switching operation. According to the present invention the microprocessor 21 is further configured to generate a second switching signal when another interface contacts the switch, the second switching signal being sent to relay 2.

The invention is not restricted to reacting to two different interfaces but could be configured to react to multiple interfaces, the precise number being dependent on the number of different media of interest likely to be encountered in a particular situation.

Referring now to FIG. 3 a plurality of operating bands 1, 2, 3 . . . Xn are possible, each operating band having an associated set of switching points between 'wet' (the medium of greater density) and 'dry' (the medium of lesser density). The other frequencies shown in each operating band in FIG. 3 are essentially to indicate fault conditions.

In the example shown operating band 3 is a default band in which the switching point between wet and dry is that typically encountered when the fork changes contact from water to air. This band may be pre-set when the switch is manufactured.

If the switch is to respond to an interface between two media of lower densities that water, then one of operating bands 1 or 2 would be selected. If the switch is to respond to interfaces between water and sludge or water and other media of greater densities than water, then one of operating bands 4 . . . Xn would be selected. The operating bands are preferably manually selectable by an operator and thus the band that gives the desired switching point in response to particular media encountered in the field, can be selected.

In the example shown in FIG. 3 the switching points in the respective operating bands are arithmetically related to the switching point in operating band 3, the default band. As shown the switching point frequencies change in increments of X % as the bands move away from operating band 3. Frequency offset value X, in this case, will be determined empirically. It should be appreciated, however, that the relationship between operating bands need not be arithmetic but could also be geometric or set by other means.

Whilst the example given in FIG. 2 shows the microprocessor 21 operating two relays, other outputs could be used.

In the case of relays, an output is required for each of the interfaces to be detected. In the case of a two-interface arrangement air-liquid and liquid-sludge, operation of the first relay would indicate the air-liquid interface as with standard point level switches. The second relay would change state when the fork detects sludge in the liquid. Details of the relay behaviour can be summarised in Table 1.

TABLE 1

| Fork State | Relay 1 State | Relay 2 state |
|---|---|---|
| Fork in air (Dry) | De-energised | De-energised |
| Fork in liquid | Energised | De-energised |
| Fork in sludge | Energised | Energised |

As a first alternative multiple voltage levels could be used to indicate different interfaces. When vibrating in air, the device would show zero volts but when at an air-liquid interface the device would set the voltage to V/2 to indicate the fork status. The second switching point would occur at the water-sludge interface, with the output being set to V. Details of voltage levels can be summarised in Table 2:

TABLE 2

| Fork State | Voltage Output State |
|---|---|
| Fork in air (Dry) | 0V (off) |
| Fork in liquid | V/2 |
| Fork in sludge | V |

As a second alternative points within standard instrument current levels (e.g. 4-20 mA and 8-16 mA) could be used to indicate different interfaces. For a device with an 8-16 mA output, 8 mA would be output when the fork was in air. Upon detection of the air-liquid interface the output would be set to 12 mA as an indication of this. Upon detetction of the liquid-sludge interface, the output would be set to full-scale (16 mA). Details of current levels are summarised in Table 3.

TABLE 3

| Fork State | Current Output State (mA) |
|---|---|
| Fork in air (Dry) | 8 |
| Fork in liquid | 12 |
| Fork in sludge | 16 |

Those skilled in the art will appreciate that physical outputs described above could be replaced or supplemented by a communications protocol interface such as, for example, HART or Profibus.

The invention claimed is:

1. A vibrating fork point level switch including:
   a fork fixed at a place wherein the vibrating fork point level switch is a single vibrating fork-based switch;
   a drive facility operable to vibrate the fork at a first frequency when the fork is exposed to air, the fork configured to vibrate at a second frequency of vibration when in contact with a first fluid in contact with said air at a first interface;
   a control facility operable to distinguish between said first and second frequencies and to output a switching signal in the event of a change between said first and second frequencies being detected;
   wherein, when the fork is exposed to a second fluid in contact with said first fluid, the fork vibrates at a third frequency of vibration at a second interface,
   said control facility being further operable to distinguish between said second frequency and said third frequency and to output a second switching signal in the event of a change between said second frequency and said third frequency.

2. The vibrating fork point level switch as claimed in claim 1 wherein said switching signals are configured to operate a plurality of relays in the event of a change of medium at the first and second interfaces.

3. The vibrating fork point level switch as claimed in claim 1 wherein said switching signals comprise different voltages to indicate a change of medium.

4. The vibrating fork point level switch as claimed in claim 1 wherein said switching signals comprise different currents to indicate a change of medium.

5. The vibrating fork point level switch as claimed in claim 1 wherein the frequencies determining at least one switching operation are manually selectable.

6. The vibrating fork point level switch as claimed in claim 1 wherein the fork is configured to operate with a plurality of operating bands, each of said bands defining different switching points wherein the different switching points each corresponds to the positions of the first and second interfaces; and a user selectable control operable to select one of said bands.

7. The vibrating fork point level switch as claimed in claim 6 including a manually operable control to effect selection of a particular band.

8. The vibrating fork point level switch as claimed in claim 6 wherein said switching points comprise switching frequencies.

* * * * *

UNITED STATES PATENT AND TRADEMARK OFFICE
CERTIFICATE OF CORRECTION

PATENT NO. : 10,571,329 B2
APPLICATION NO. : 15/572179
DATED : February 25, 2020
INVENTOR(S) : Tadewos Tzegazeab, Rehan Azfar Ashraf and Gregory Michael Leach It is certified that error appears in the above-identified patent and that said Letters Patent is hereby corrected as shown below:

In the title, please delete:
"LEVEL SWITCHES"
And insert:
--IMPROVEMENTS IN OR RELATING TO LEVEL SWITCHES--

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*